(12) United States Patent
Xie et al.

(10) Patent No.: US 6,546,168 B1
(45) Date of Patent: Apr. 8, 2003

(54) INTEGRATED ISOLATOR FUSED COUPLER METHOD AND APPARATUS

(75) Inventors: Ping Xie, San Jose, CA (US); Yonglin Huang, San Jose, CA (US); Peter Zupei Chen, Santa Clara, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 09/458,869

(22) Filed: Dec. 10, 1999

(51) Int. Cl.⁷ .................................................. G02B 6/26
(52) U.S. Cl. ............................... 385/39; 385/24; 385/48
(58) Field of Search ......................... 385/15–24, 31, 385/33–35, 39, 47, 48; 359/115, 117, 124–128, 131, 132, 133

(56) References Cited

U.S. PATENT DOCUMENTS

| | | | | |
|---|---|---|---|---|
| 5,016,970 A | * | 5/1991 | Nagase et al. | 385/60 |
| 5,082,343 A | * | 1/1992 | Coult et al. | 359/131 |
| 5,295,217 A | | 3/1994 | Marcerou et al. | 385/122 |
| 5,375,010 A | | 12/1994 | Zervas et al. | 359/341 |
| 5,555,330 A | * | 9/1996 | Pan et al. | 385/39 |
| 5,619,604 A | * | 4/1997 | Shiflett et al. | 385/52 |
| 5,649,039 A | * | 7/1997 | Benzoni et al. | 455/575 |
| 5,657,155 A | | 8/1997 | Cheng | 359/341 |
| 5,715,340 A | * | 2/1998 | Sasagawa | 385/33 |
| 5,796,889 A | * | 8/1998 | Xu et al. | 385/24 |
| 5,889,904 A | * | 3/1999 | Pan et al. | 359/131 |
| 5,956,441 A | | 9/1999 | Fairchild et al. | |
| 6,017,153 A | * | 1/2000 | Carlisle et al. | 385/56 |
| 6,081,641 A | * | 6/2000 | Chen | 359/494 |
| 6,203,210 B1 | * | 3/2001 | Mikula et al. | 385/60 |

FOREIGN PATENT DOCUMENTS

| | | | | |
|---|---|---|---|---|
| EP | 0684492 A1 | * | 11/1995 | G02B/6/28 |
| JP | 07318744 | | 8/1995 | |
| JP | 08136760 | | 5/1996 | |
| JP | 08160247 A | * | 6/1996 | G02B/6/28 |

OTHER PUBLICATIONS

International Search Report, application No. PCT/US00/33051, mailed Jul. 26, 2001.

* cited by examiner

*Primary Examiner*—Akm E. Ullah
*Assistant Examiner*—Michelle R. Connelly-Cushwa
(74) *Attorney, Agent, or Firm*—Fish & Richardson P.C.

(57) ABSTRACT

Disclosed are fiber optic devices. The fiber optic devices disclosed include integrated fiber optic coupler-isolator combinations. These combinations are especially applicable to fiber optic tapping and pumping arrangements. By integrating such devices into a housed subassembly, enhanced size and design characteristics are achieved.

29 Claims, 3 Drawing Sheets

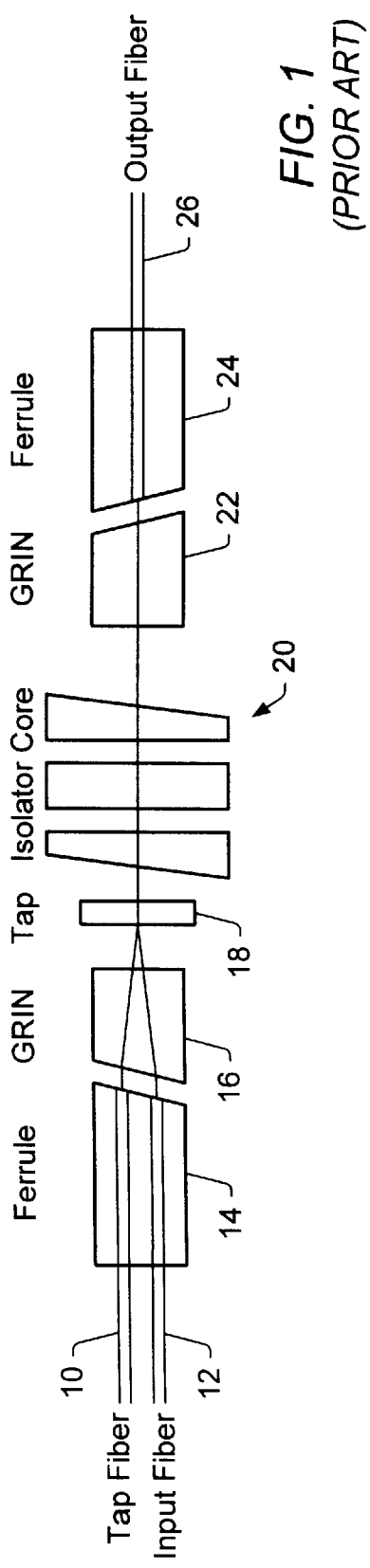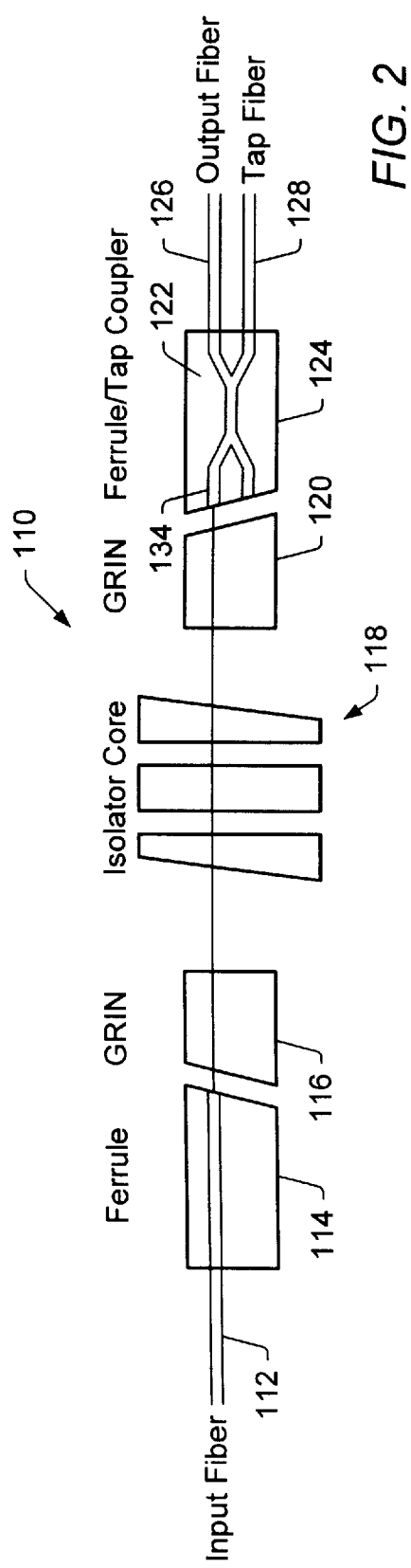

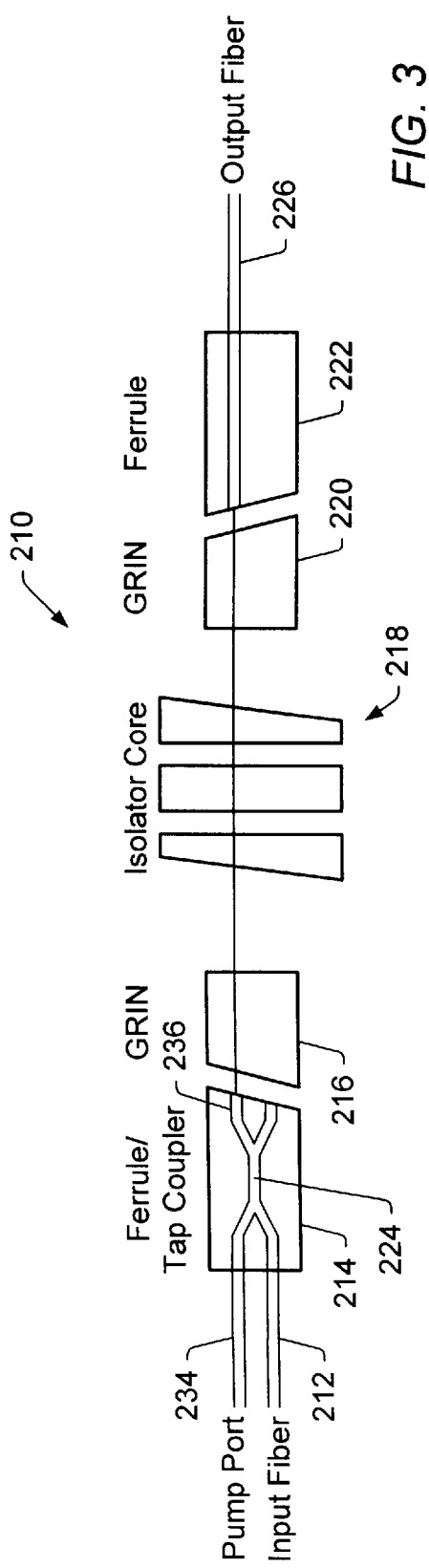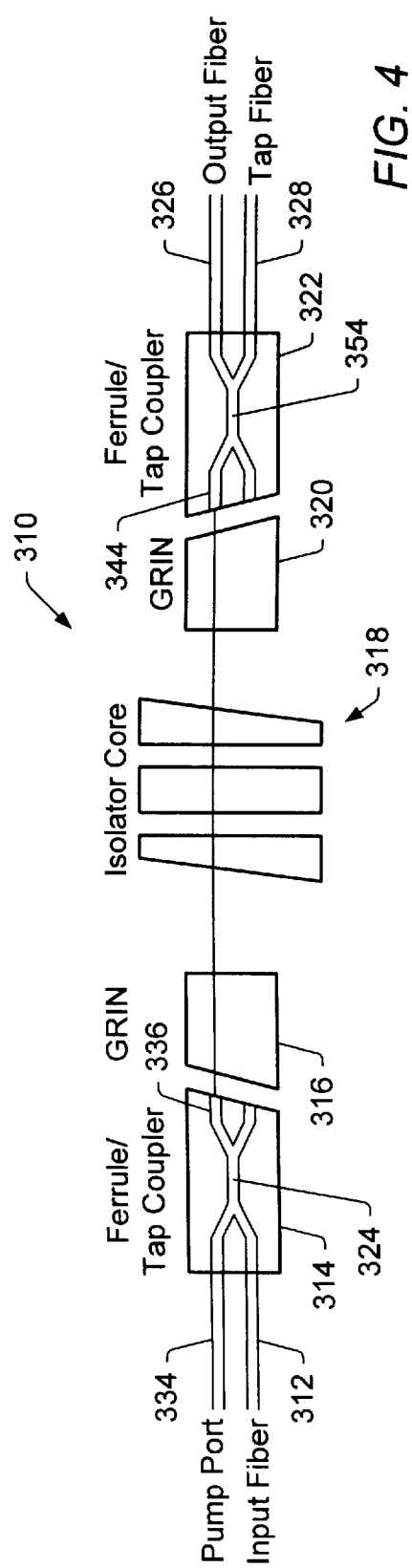

INTEGRATED ISOLATOR FUSED COUPLER METHOD AND APPARATUS

BACKGROUND OF THE INVENTION

1. Field of the Invention

This invention relates to fiber optic devices. More particularly, this invention relates to the integration of fiber optic coupling devices with optical isolators. Further, this invention relates to ultra stable fiber optical devices utilized in coupling arrangements integrated with isolators, for instance in fiber tap applications and fiber optic amplification applications.

2. The Prior Art

Fiber optical couplers and isolators exist in the prior art. Each of them performs a specific function in the fiber optical system. For example, one type of fiber optical coupler can be used to split optical power into multiple channels with various splitting ratios. Another type of fiber optical coupler can perform the function of wavelength division multiplexing and demultiplexing. Optical isolators have been used to allow light to propagate only in one direction, the light propagating in the other direction will be directed into a different optical path and suffers a significant loss in such prior devices. In an optical system where both a coupler and an isolator are needed, they are usually combined with a fusion splice (such as those depicted in U.S. Pat. No. 5,375,010). This type of integration is usually bulky and not cost effective. In addition, a splice causes loss, which adds to the overall loss of the optical system. Thus, there is a need to produce smaller, less expensive and low loss integrated coupler-isolator devices. Specifically, an integrated tap-isolator and WDM-isolator is of great interest to optical system developers.

Taps for optical fibers are known in the prior art. The purpose of such taps is to bleed off a small portion of optical signal to analyze the signal for desirable characteristics. One example of an integrated tap-isolator or WDM-isolator as exists in the prior art that uses a dielectric thin film reflector is shown in FIG. 1. However, such prior art taps suffer from a number of shortcomings. First, the tap ratio is highly dependent on the characteristics of the dielectric thin film filter which is sometimes sensitive to environmental variation such as temperature and humidity. A temperature insensitive filter is thus required in most applications, which adds cost. Further, the tapping is not provided directly on the output of the device or on the input of the device. In other words, the optical coupling of the tap port to the input port is different to that of the output port to the input port. Environmental variations such as temperature, humidity and stress will affect the optical coupling differently with respect to the tap port and the output port. The variation of optical coupling of tap port and output port will create variations in the tap ratio with respect to environmental changes which is not desirable in the optical systems.

In addition, such prior art taps also suffer from various other shortcomings. For example, many such prior art taps rely on a reflective tap coating. However, it is known that the optical characteristics of such coatings have a tendency to change with temperature as well and this may adversely affect the tap performance. Furthermore, many prior art taps depend on mechanical alignment to perform as desired. As one can appreciate, and as is well known in the prior art, precise alignment of prior art taps is difficult at best. Failure to properly align the tap or mechanical shock, e.g., from dropping the unit, will result in additional unwanted optical losses.

U.S. Pat. No. 5,657,155 to Cheng attempts to overcome the traditional tap problem by employing a holographic beam splitter (HBS) instead of a reflector/splitter in various fashions with and without wavelength division multiplexers (WDMs). However, the addition of an HBS to the tap circuit creates its own problems and complications, not the least of which is cost. The HLBS is usually costly and lossy. In addition, it relies on optical alignment of the output port and the tap port to split input optical beams at the same time. Manufacturing of this type of device is non-trival and it suffers the same problem of variation of tap ratio with respect to environmental changes as explained in the case of dialectic thin film tap-isolators.

BRIEF DESCRIPTION OF THE INVENTION

To overcome these and other shortcomings of the prior art, disclosed herein is an integrated isolator fused coupler. By utilizing improved fused biconical tapered couplers (tap or WDM types) in combination with a simplified isolator circuit, in various forms, such will not only result in a smaller device, but improved optical performance is also achieved.

The inventive integrated isolator fused couplers disclosed herein have many advantages over the prior art. For instance, by employing all fiber components for taping or WDM applications, the circuit is less sensitive to wavelength characteristics and temperature. Additionally, the inventive integrated isolator fused couplers are not dependent on mechanical alignment. As a tap, the invention taps the desirable output signal directly with fewer components than employed in prior art devices and with reduced loss. Furthermore, by packaging the fused fiber coupler into the isolator subassembly, i.e. collimator/ferrule, a reduced footprint is achieved.

It is therefore a primary object of the present invention to provide an integrated isolator fused coupler with less overall additional components as compared to the prior art.

It is another object of the present invention to provide an integrated isolator fused coupler embodied as a tap that includes both low loss and increased signal throughput.

It is another object of the present invention to provide an integrated isolator fused coupler in a forward pumping arrangement.

It is yet another object of the present invention to provide an integrated isolator fused coupler combining both a forward pumping arrangement and a tap at an output end thereof.

It is also an object of the present invention to provide an integrated isolator fused coupler that is smaller in size as compared to similar prior art devices, wherein tapping or WDM functions are performed utilizing a fused fiber approach, and is therefore not as sensitive to temperature, light characteristics, and humidity as compared to prior art devices.

Viewed from one vantage point, a fiber optic tap is disclosed, comprising in combination at least one fiber optic coupler and a fiber optic isolator optically coupled to said fiber optic coupler wherein said fiber optic coupler is integrated in a subassembly of said fiber optic isolator.

Viewed from another vantage point, a fiber optic WDM-isolator assembly is disclosed, comprising in combination a wavelength division multiplexer and a fiber optic isolator optically coupled to said wavelength division multiplexer.

Viewed from another vantage point, a fiber optic WDM-pump combination is disclosed, comprising in combination a first fiber optic coupler, a fiber optic isolator optically coupled to said first fiber optic coupler, and a second fiber optic coupler optically coupled with said fiber optic isolator.

Viewed from yet another vantage point, a fiber optic assembly is disclosed, comprising in combination an input fiber partially encased within a ferrule and extending from said ferrule, a first lens optically coupled to said input fiber, an optical isolator optically coupled to said first lens, a second lens optically coupled to said optical isolator, and a fiber optic coupler encased within a ferrule, said fiber optic coupler including a first pair of pigtail ends and a second pair of pigtail ends, one of said first pair of said pigtail ends optically coupled to said second lens.

BRIEF DESCRIPTION OF THE DRAWING FIGURES

FIG. 1 is a schematic diagram of a prior art fiber optic tap.

FIG. 2 is a schematic diagram of a first embodiment of an integrated isolator fused coupler embodied as a fiber optic tap according to the present invention.

FIG. 3 is a schematic diagram of a third embodiment of an integrated isolator fused coupler embodied in a forward pumping combination according to the present invention.

FIG. 4 is a schematic diagram of a second embodiment of an integrated isolator fused coupler embodied in a forward pumping and output tapping combination according to the present invention.

DETAILED DESCRIPTION OF A PREFERRED EMBODIMENT

Figure 5:
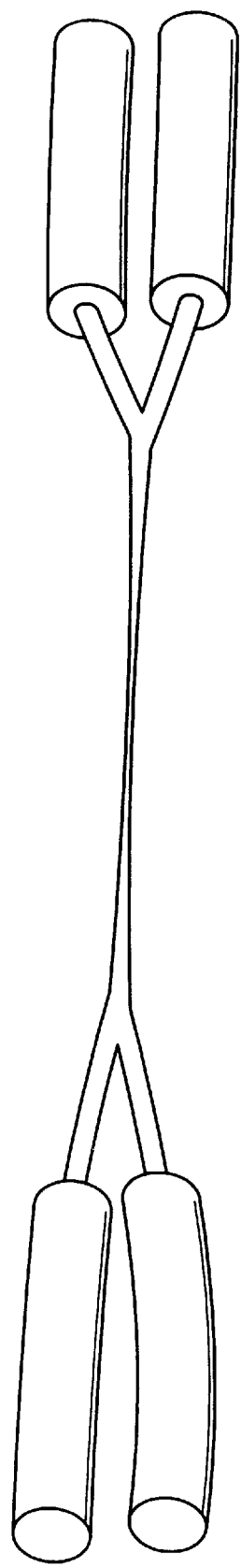
FIG. 5 is a schematic diagram of a preferred fused fiber coupler for use in the present invention.

Persons of ordinary skill in the art will realize that the following description of the present invention is illustrative only and not in any way limiting. Other embodiments of the invention will readily suggest themselves to such skilled persons having the benefit of this disclosure.

As alluded to above, prior art mechanical tap devices are limited in their utility. One such prior art device can be found in FIG. 1. As shown in FIG. 1, the illustrated prior art tap circuit includes a tap fiber 10 and an input fiber 12 affixed within ferrule 14 and extending therefrom and optically coupled to GRaded INdex (GRIN) lens 16. Thereafter, GRIN lens 16 is optically coupled to tap filter/reflector 18 which in turn is optically coupled to isolator 20. Isolator 20 is then optically coupled to an oppositely disposed GRIN lens 22 which in turn is optically coupled to output fiber 26 affixed within ferrule 24.

In operation, an input signal emitted from input fiber 12 is collimated in the direction of tap filter 18 via GRIN lens 16. While a portion of the input light signal is allowed to travel through tap filter 18, a portion is also reflected back through GRIN lens 16 and out to tap fiber 10. In this manner, that portion exiting tap fiber 10 may be monitored and sampled as desired. The remaining forward propagating input signal, now weakened in strength, may propagate through isolator 20. Thereafter, light exiting isolator 20 is focused out and through con, gruently arranged GRIN lens 22 (as compared to GRIN lens 16) to output fiber 26. The problem is that the output signal is normally the signal of most interest, but the tap signal is related to the input signal through GRIN lens 16; that is, the signal as it exists prior to passing through the isolator 20 and GRIN lens 22. Furthermore, due to the physical characteristics of tap filters such as 18, such devices are sensitive to temperature, humidity, and input light characteristics. These and other deficiencies of this type of prior art device are overcome by the present invention as described hereinafter.

Referring now to FIG. 2, reference numeral 110 is directed to an integrated isolator fused tap coupler according to a first embodiment of the present invention. Integrated fused tap coupler 110 includes an input fiber 112 affixed within ferrule 114 which, in turn, is optically coupled to GRIN lens 116. GRIN lens 116 is thereafter optically coupled to isolator 118. By further providing an 8° to 12° angle at the ferrule/coupler interface, back-reflection may be precluded as well. This will be true as well for the additional applications disclosed below for similar ferrule/coupler junction regions.

As will be appreciated by those individuals having skill in the art, GRIN lens 116 is appropriately formed to collimate light signals entering GRIN lens 116 in the direction of isolator 118. Likewise, as will be appreciated by those individuals having skill in the art, isolator 118 is appropriately formed to allow light to pass only in one direction through isolator 118; and in this case, when viewing FIG. 2, light may only pass from left to right, but may not pass from right to left.

Thereafter, isolator 118 is likewise optically coupled to GRIN lens 120 which, like GRIN lens 116 but in an opposite arrangement, is optically coupled to fiber 134. Ferrule 122 includes a fused tap coupler 124 therewithin. Fused tap coupler 124 includes input port 134 optically coupled to GRIN lens 120, output fiber 126 and tap fiber 128.

Fused tap coupler 124 is preferably of a fused fiber variety. As depicted in FIG. 5, a fused biconical tap coupler is schematically shown. Via a process of a combination of heating and stretching, which is known in the art, an appropriate fused coupler is formed.

It will be now appreciated and understood that the entirety of the integrated tap isolator circuit thus described is preferably contained and confined within an appropriate housing (not shown) as is customary for integrated isolators. Thus, fibers 112, 126, and 128 will be the only visible external parts to be utilized by an appropriate user of the self-contained device. Input fiber 112, output fiber 126, and tap fiber 128 may thus be coupled as desired by such user to an appropriate fiber optic arrangement.

In use and operation, light entering input fiber 112 will propagate through ferrule 114 via said fiber 112 and be collimated by GRIN lens 116 in the direction of isolator 118. Thereafter, light exiting isolator 118 will be focused by GRIN lens 120 toward a first input port 134 of fused coupler 124, where GRIN lens 120 is reversedly oriented as compared to GRIN lens 116, as will be appreciated by those individuals having ordinary skill in the art.

As will now be appreciated, the tap ratio of the fused coupler can be easily varied from 0% to 100% by utilizing an appropriately configured coupler, although a range of 1–10% has been usually selected for monitoring purposes. Furthermore, the tap signal provided is a true representation of the output signal.

Referring now to FIG. 3, reference numeral 210 is directed to an integrated isolator fused WDM according to a second embodiment of the present invention. Integrated isolator fused WDM 210 includes WDM 224 within ferrule 214 at a first operative end of WDM-isolator 210. WDM 224 includes an input signal fiber 212 and a pump port 234 on one side of WDM 224 and an output port 236 on the opposing side of WDM 224. Output port 236 is thereafter optically coupled to GRIN lens 216. GRIN lens 216 is then optically coupled to isolator 218 which in turn is optically coupled to a complimentarily, but reversedly, arranged GRIN lens 220 (as compared to GRIN lens 216). Likewise, GRIN lens 220 is optically coupled via ferrule 222 to output fiber 226. Furthermore the entirety of the disclosed FIG. 3 device is encapsulated within an appropriate housing (not shown) forming an integrated WDM/isolator unit.

As will be understood by those individuals skilled in the art, a fiber optic pumping/amplifying circuit is one in which a pump beam is utilized to excite optically active gain medium along the same path of the input signal to enhance the input signal strength. However, as is known, the pump beam will also induce amplified spontaneous emission (ASE). Isolators are used in such circuits to prevent ASE and any other back-reflected signal from interfering in a backward manner with the signal path as well as the pump path in such circuits. Most such circuits, as for example that depicted in U.S. Pat. No. 5,657,155, are complex and include elements not required by the present invention.

Therefore, in use and operation, signal light propagating through fiber 212 and pump light propagating through fiber 234 will be combined via WDM coupler 224 and will exit through the same output fiber 236. This combined light beam will thus be collimated in the direction of isolator 218 by GRIN lens 216. Thereafter, light may pass through isolator 218 but not pass back through isolator 218 and proceed to be focused by GRIN lens 220 in the direction of output fiber 226 affixed within ferrule 222. For application in the realm of erbium doped fiber amplifier (EDFA), the pump signal is typically in the range of 1400–1490 nm and the signal wavelength is typically in the range of 1520–1620 nm. The isolator can be optimized either in the signal band or in the pump wavelength band. Although the example shown here is intended for integration of pump-signal WDM with isolator, the inventive arrangement shown here can also be applied to integration of a signal-signal WDM with isolator or pump-pump WDM with isolator.

Referring now to FIG. 4, reference numeral 310 is directed to an integrated isolator WDM tap coupler according to a third embodiment of the present invention. Integrated isolator fused WDM tap device 310 includes WDM 324 within ferrule 314 at a first operative end of device 310. WDM 324 includes an input signal fiber 312 and a pump port 334 on one side of WDM 324 and an output port 336 on the opposing side of WDM 324. Output port 336 is thereafter optically coupled to GRIN lens 316. GRIN lens 316 is then optically coupled to isolator 318 which in turn is optically coupled to a complimentarily, but reversedly, arranged GRIN lens 320.

Up to this point, the circuit 310 has been identical to circuit 210 of FIG. 3. Hereafter the tap component is integrated herewith, unlike circuit 210. Thus, GRIN lens 320 is optically coupled via ferrule 322 to input port 344 of WDM 354. The signal then propagates in substantial part to output fiber 326 and in insubstantial part to tap fiber 328, not unlike the tap described in circuit 110 for FIG. 2. Therefore, as can now be understood, circuit 310 is a combination of circuits 110 and 210. Integrating pump signal WDM and tapping into one all fiber component circuit minimizes losses associated with accomplishing this functionality with discrete component circuits. Furthermore, the entire device depicted in FIG. 4 is integrated within an appropriate housing (not shown).

In use and operation, integrated isolator WDM tap device 310, likewise works as a combination of circuits 110 and 210. That is, signal entering fiber 312 is combined with pump signal through pump port 334 and exits through fiber 336 by way of WDM 324. The combined signal-pump light then propagates out through output port 336 of WDM 324. Then the signal is collimated via GRIN lens 316 in the direction of isolator 318. Thereafter, GRIN lens 320 focuses the signal toward input port 344 of tap coupler 354. The signal then predominantly propagates out through output fiber 326. However, a small portion of the signal, preferably in the range of 1% to 10% is tapped off to tap fiber 328 for appropriate monitoring.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An integrated fiber optical isolator-coupler assembly comprising:
    a fused fiber optic coupler;
    a fiber optic isolator optically coupled to a first side of the fused fiber optic coupler; and
    at least two output fibers optically coupled to a second side of the fused fiber optic coupler, wherein at least one output fiber is a tap fiber;
    wherein a portion of an optical signal that propagates from the fused fiber optic coupler propagates through the tap fiber, and wherein the portion of the optical signal that propagates through the tap fiber is used to monitor the optical signal that propagates from the fused fiber optic coupler during use.

2. The integrated fiber optical isolator-coupler assembly of claim 1, further comprising:
    a first collimator optically coupled to a first side of the fiber optic isolator; and a second collimator optically coupled to a second side of the fiber optic isolator.

3. The integrated fiber optical isolator-coupler assembly of claim 2, wherein the second collimator is comprised of a focusing lens and an optical fiber, wherein the optical fiber is one port of the fused fiber optic coupler.

4. The integrated fiber optical isolator-coupler assembly of claim 2, wherein the first collimator includes a GRIN lens.

5. The integrated fiber optical isolator-coupler assembly of claim 2, wherein the first collimator includes a micro-optical lens.

6. The integrated fiber optical isolator-coupler assembly of claim 2, wherein the first collimator includes an a spherical lens.

7. The integrated fiber optical isolator-coupler assembly of claim 1, further comprising a housing enclosing the fused fiber optic coupler and the fiber optic isolator.

8. The integrated fiber optical isolator-coupler assembly of claim 1, wherein the fused fiber optic coupler is a fused biconically tapered coupler.

9. The integrated fiber optical isolator-coupler assembly of claim 1, wherein the fused fiber optic coupler is a power splitting coupler.

10. The integrated fiber optical isolator-coupler assembly of claim 1, wherein the fused fiber optic coupler is a wavelength division multiplexing coupler.

11. The integrated fiber optical isolator-coupler assembly of claim 1, wherein the fused fiber optic coupler is coupled to receive an optical signal output from the isolator during use.

12. The integrated fiber optical isolator-coupler assembly of claim 1, wherein the portion of the optical signal that propagates through the tap fiber comprises between about 1% and about 10% of the optical signal that propagates from the fused fiber optic coupler.

13. The integrated fiber optical isolator-coupler assembly of claim 1, wherein the portion of the optical signal that propagates through the tap fiber comprises a percentage of the optical signal that propagates from the fused fiber optic coupler that remains substantially unchanged with variations in at least one of temperature, light characteristics, and/or humidity during use.

14. The integrated fiber optical isolator-coupler assembly of claim 1, wherein the portion of the optical signal that propagates through the tap fiber comprises a true representation of the optical signal that propagates from the fused fiber optic coupler.

15. An intergrated fiber optic wavelength division multiplexer-isolater assembly comprising:
a fused fiber optic wavelength division multiplexer;
a fiber optic isolator optically coupled to a first side of the fused fiber optic wavelength division multiplexer; and
at least two fibers optically coupled to a second side of the fused fiber optic wavelength division multiplexer, wherein at least one fiber is an input fiber, and wherein at least one fiber is a pump fiber;
wherein an optical signal propagates from input fiber to the fused fiber optic wavelength division multiplexer;
wherein a pump beam propagates from the pump fiber to the fused fiber optic wavelength division multiplexer;
wherein the pump beam is used to amplify the optical signal during use, wherein the optical signal is amplified before the optical signal propagates through the fiber optic isolator, and wherein the pump beam propagates in a substantially parallel direction to the optical signal.

16. The integrated fiber optic wavelength division multiplexer-isolator assembly of claim 15, wherein at least two fibers are input fibers, and wherein optical signals propagate from the input fibers and are combined in the fused fiber optic wavelength division multiplexer during use.

17. The integrated fiber optic wavelength division multiplexer-isolator assembly of claim 15, wherein at least two fibers are pump fibers, and wherein pump beams propagate from the pump fibers and are combined in the fused fiber optic wavelength division multiplexer during use.

18. The integrated fiber optic wavelength division multiplexer-isolator assembly of claim 15, further comprising a plurality of optical lenses, wherein at least one optical lens is optically coupled to an input side of the fiber optic isolator, and wherein at least one optical lens is optically coupled to an output side of the fused fiber optic wavelength division multiplexer.

19. The integrated fiber optic wavelength division multiplexer-isolator assembly of claim 15, further comprising a housing enclosing the fused fiber optic wavelength division multiplexer and the fiber optic isolator.

20. A fiber optic assembly comprising:
a fused fiber optic wavelength division multiplexer;
at least two fibers optically coupled to the fused fiber optic wavelength division multiplexer;
a fused fiber optic coupler;
a fiber optic isolator optically coupled to a first side of the fused fiber optic wavelength division multiplexer and the fused fiber optic coupler; and
at least two output fibers optically coupled to a second side of the fused fiber optic coupler, wherein at least one output fiber is a tap;
wherein a portion of an optical signal that propagates from the fused fiber optic coupler propagates through the tap fiber, and wherein the portion of the optical signal that propagates through the tap fiber is used to monitor the optical signal that propagates from the fused fiber optic coupler during use.

21. The fiber optic assembly of claim 20, wherein the portion of the optical signal that propagates through the tap fiber comprises between about 1% and about 10% of the optical signal that propagates from the fused fiber optic coupler.

22. The fiber optic assembly of claim 20, wherein the portion of the optical signal that propagates through the tap fiber comprises a percentage of the optical signal that propagates from the fused fiber optic coupler that remains substantially unchanged with variations in at least one of temperature, light characteristics, and/or humidity during use.

23. The fiber optic assembly of claim 20, wherein at least one fiber coupled to the fused fiber optic wavelength division multiplexer is an input fiber, wherein at least one fiber coupled to the fused fiber optic wavelength division multiplexer is a pump fiber, wherein an optical signal propagates from the input fiber to the fused fiber optic wavelength division multiplexer, wherein a pump beam propagates from the pump fiber to the fused fiber optic wavelength division multiplexer, and wherein the pump beam is used to amplify the optical signal during use.

24. The fiber optic assembly of claim 23, wherein the optical signal is amplified before the optical signal propagates through the fiber optic isolator, and wherein the pump beam propagates in a substantially parallel direction to the optical signal.

25. The fiber optic assembly of claim 23, further comprising a housing enclosing the fiber optic isolator, the fused fiber optic coupler, and the fused fiber optic wavelength division multiplexer.

26. The fiber optic assembly of claim 23, wherein the fused fiber optic coupler and the fused fiber optic wavelength division multiplexer comprise fused biconically tapered couplers.

27. The fiber optic assembly of claim 23, wherein the fused fiber optic coupler and the fused fiber optic wavelength division multiplexer are contained within ferrules.

28. The fiber optic assembly of claim 20, further comprising a first lens optically coupled between the fiber optic isolator and the fused fiber optic coupler, and a second lens optically coupled between the fiber optic isolator and the fused fiber optic wavelength division multiplexer.

29. A fiber optic assembly, comprising:

an input fiber partially encased within a first ferrule and extending from the first ferrule;

a first lens optically coupled to the input fiber;

a fiber optic isolator optically coupled to the first lens;

a second lens optically coupled to the fiber optic isolator;

a fiber optic coupler comprised within a second ferrule, wherein the fiber optic coupler comprises a first pair of pigtail ends, a fused region, and a second pair of pigtail ends, wherein the fused region couples the first pair of pigtail ends to the second pair of pigtail ends, and wherein a first side of the coupler having one of the pair of pigtail ends is optically coupled to the second lens; and at least two output fibers optically coupled to one of the pigtail ends at a second side of the fiber optic coupler, wherein at least one output fiber is a tap fiber; wherein a portion of an optical signal that propagates from the fiber optic coupler propagates through the tap fiber, and wherein the portion of the optical signal that propagates through the tap fiber is used to monitor the optical signal that propagates from the fiber optic coupler during use.

* * * * *